US007224853B1

(12) United States Patent
Moni

(10) Patent No.: US 7,224,853 B1
(45) Date of Patent: May 29, 2007

(54) METHOD AND APPARATUS FOR RESAMPLING DATA

(75) Inventor: Shankar Moni, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 568 days.

(21) Appl. No.: 10/158,694

(22) Filed: May 29, 2002

(51) Int. Cl.
*G06K 9/32* (2006.01)

(52) U.S. Cl. .................. 382/300; 704/265; 386/50; 386/73; 381/94.4; 345/475; 345/606; 358/525

(58) Field of Classification Search ................. 382/300
See application file for complete search history.

(56) References Cited

U.S. PATENT DOCUMENTS

| | | | | |
|---|---|---|---|---|
| 5,682,326 | A * | 10/1997 | Klingler et al. | 715/500.1 |
| 5,953,465 | A * | 9/1999 | Saotome | 382/300 |
| 6,157,749 | A * | 12/2000 | Miyake | 382/300 |
| 6,175,430 | B1 * | 1/2001 | Ito | 358/525 |
| 6,801,719 | B1 * | 10/2004 | Szajewski et al. | 396/333 |
| 6,941,013 | B1 * | 9/2005 | Drayer | 382/168 |
| 2003/0081225 | A1 * | 5/2003 | Nakami et al. | 358/1.2 |

OTHER PUBLICATIONS

Press, W. Teukolsky, S. Vetterling, W. Flannery, B., Numerical Recipes in C The Art of Scientific Computing, 1992, 2nd Edition, ISBN 0-521-43108-5.*
Lehmann, T.M., Gonner, C., Spitzer, K., "Survey: Interpolation Methods in Medical Image Processing", Medical Imaging, IEEE Transactions on, Nov. 1999, ISSN: 0278-0062.*
Baxes, G.A., "Digital Image Processing: Principles and Applications", John Wiley and Sons, Inc., 1994, ISBN 0-471-00949-0, pp. 118-119.*
Lee, et al.; "Scattered Data Imterpolation with Multilevel B-Splines"; IEEE Transactions on Visualization and Computer Graphics, vol. 3, No. 3; Jul.-Sep. 1997; pp. 228-244.
Renka, Robert; "Multivariate Interpolation of Large Sets of Scattered Data"; ACM Transactions on Mathematical Software, vol. 14, No. 2; Jun. 1988; pp. 139-148.

(Continued)

*Primary Examiner*—Matthew C. Bella
*Assistant Examiner*—Sath V. Perungavoor
(74) *Attorney, Agent, or Firm*—Lee & Hayes, PLLC

(57) ABSTRACT

A set of known data samples are identified and an approximation of an original function from which the known data samples were obtained is created. The approximation function is then resampled to obtain desired values that are not contained in the set of known data samples.

10 Claims, 5 Drawing Sheets

OTHER PUBLICATIONS

Xiang, et al.; "A Generalized Approximate Cross Validation For Smoothing Splines With Non-Gaussian Data"; Statistica Sinica 6(1996), pp. 675-692.

Keys, Robert; "Cubic Convolution Interpolation for Digital Image Processing"; IEEE Transactions on Acoustics, Speech and Signal Processing, vol. ASSP-29, No. 6; Dec. 1981; pp. 1153-1160.

Anderson, et al.; "A Cubic Spline Interpolation of Unequally Spaced Data Points"; Computer Physics Communications 16 (1979); pp. 199-206; North-Holland Publishing Company.

Knudson, et al.; "Discrete Data Smoothing By Spline Interpolation With Application To Initial Geometry Of Cable Nets"; Computer Methods In Applied Mechanics And Engineering 4 (1974); pp. 321-348; North-Holland Publishing Company.

Verlan, I.I.; "An Explicit Method of C2 Interpolation Using Splines"; Computing 50, (1993); pp. 327-335; Springer-Verlag 1993; Printed in Austria.

Kashyap, et al.; "Using the Residual Area Criterion for Signal Reconstruction from Noiseless and Noisy Samples"; IEEE Transactions On Signal Processing, vol. 44, No. 3; Mar. 1996; pp. 732-739.

De Boor, Carl; "On Uniform Approximation by Splines"; Journal of Approximation Theory 1,; pp. 219-235; (1968).

* cited by examiner

METHOD AND APPARATUS FOR RESAMPLING DATA

TECHNICAL FIELD

This invention relates to data processing and, in particular, to the resampling of audio and/or video data.

BACKGROUND

Various audio and/or video processing systems receive audio data at a particular rate and receive video data having an associated aspect ratio and image resolution. In certain situations, it may be necessary to change the rate of the audio data or change the aspect ratio, image resolution, or other characteristic of the video data. When changing these characteristics, it may be necessary to create new data points by interpolating the new data point from two or more known data elements. This process of creating new data points from existing data is often referred to as "resampling data".

An example of video resampling reduces (i.e., resamples) an original video image having a 480×720 pixel resolution to a new video image having a smaller size, such as a 280×352 pixel resolution. Alternatively, an original video image can be resampled to a new video image having a larger size. With respect to audio data, an audio data clip having a duration of 2.3 seconds may be resampled to reduce the audio data clip duration to 2.2 seconds. Alternatively, an audio data clip can be resampled to increase the duration of the audio clip.

Resampling is commonly used with video data when encoding video data for display at various spatial resolutions to fit particular displays. Resampling is also used to enable spatial transcoding (the process of converting data from one format to another). A particular type of video signal is referred to as an "interlaced video signal". Interlaced video signals first generate all odd numbered lines on a video display, then generate all even numbered lines on the display. Resampling can be used to de-interlace these types of video signals (i.e., determining the value of a pixel between two pixels in even numbered lines or in odd numbered lines).

An existing procedure for resampling is a four-step process. First, the received data is pre-filtered. Second, the filtered data is downsampled (e.g., taking every Mth data element). Third, the downsampled data is upsampled (e.g., adding N zeros between data elements). Finally, the upsampled data is post-filtered to complete the resampling process. This four-step process for resampling requires long filters to obtain an acceptable visual quality of the data.

Accordingly, there is a need for a resampling procedure that provides a new technique with improved results while maintaining a high quality resampled video image.

SUMMARY

A function-based resampling technique allows audio and video data to be resampled with high perceptual quality and low complexity. In particular, the systems and methods described herein resample a continuous-time function, created by interpolation of the available discrete-time data. As an example, such a function can be created using a spline, which is a smooth curve that passes through two or more points. Splines are generated using mathematical formulas that define the smooth curve.

In a particular embodiment, a set of known data samples are identified. The system then creates an approximation of an original function from which the known data samples were obtained. The approximation function is then resampled to obtain desired values.

BRIEF DESCRIPTION OF THE DRAWINGS

The same numbers are used throughout the drawings to reference like features and components.

DETAILED DESCRIPTION

The systems and methods described herein utilize function-based resampling by using the existing data samples f(n) to construct an approximation function $f_1(x)$ (also referred to as a hypothetical function) of the original function f(x) from which sampled data is obtained. The approximation function is then resampled as necessary to generate the desired data points.

Figure 1:
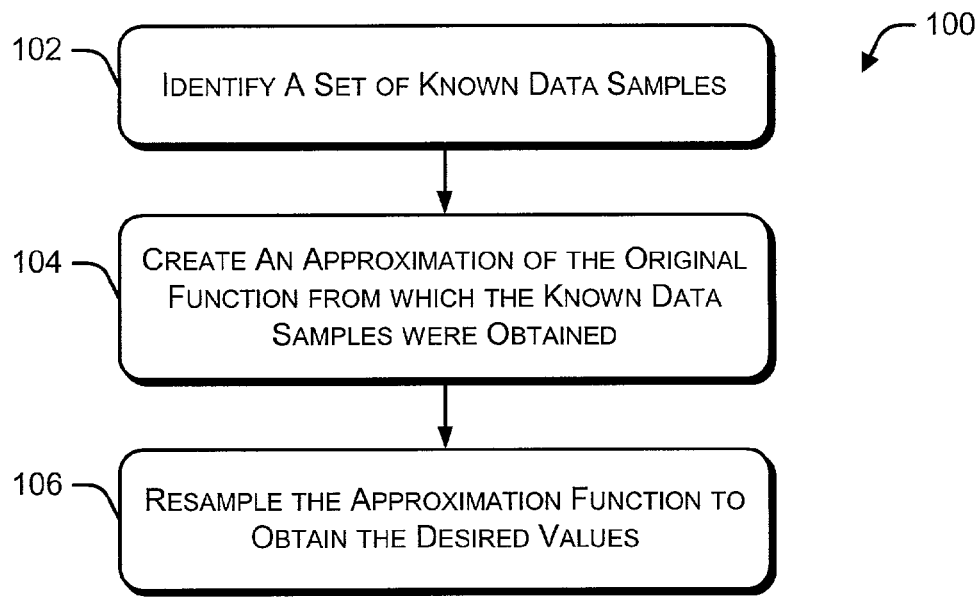
FIG. 1 is a flow diagram illustrating a general procedure for resampling data.

FIG. 1 is a flow diagram illustrating a general procedure 100 for resampling data. Initially, the procedure identifies a set of known data samples (block 102). These known data samples may be data samples associated with a video signal or an audio signal. Next, the procedure creates an approximation of the original function from which the known data samples were obtained (block 104). The approximation function is then resampled to obtain the desired values (block 106). Additional details regarding the resampling procedure are provided below.

The approach in function-based resampling uses known data samples f(n) to construct an approximation function $f_1(x)$ of the original function f(x) from which sampled data is obtained. The approximation function $f_1(x)$ is then sampled to determine the value of additional data samples that differ from the known data samples.

Figure 2:
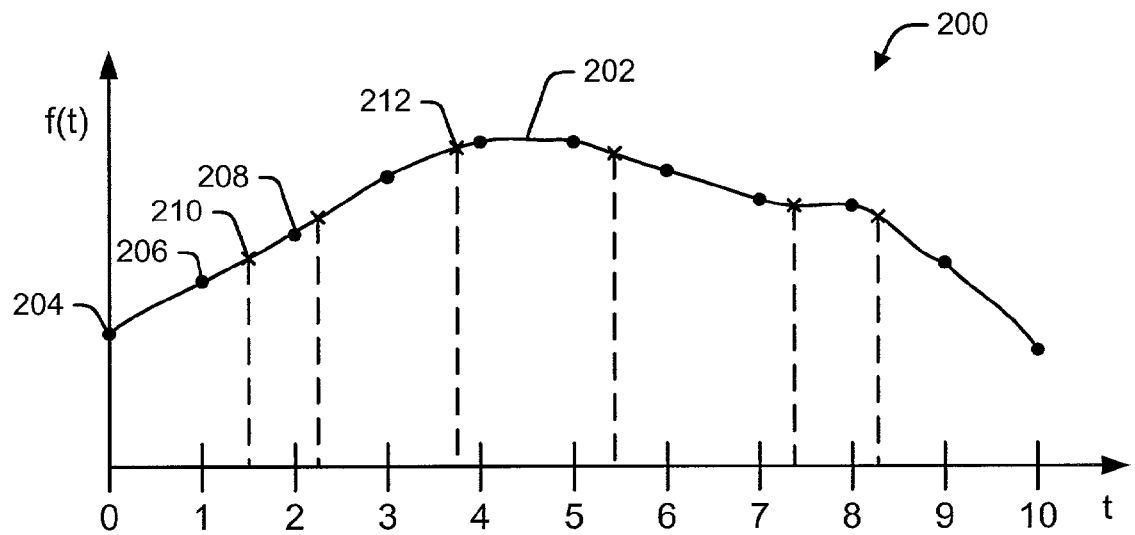
FIG. 2 illustrates a hypothetical function f(t) that interpolates the known data samples.

FIG. 2 illustrates a hypothetical function f(t) 200 (i.e., a function of time) that interpolates the known data samples. As shown in FIG. 2, the hypothetical function f(t) is represented by solid line 202. The solid dots on function f(t) represent at least a portion of the known data samples. For example, dot 204 corresponds to the known data sample when t=0. Similarly, dot 206 corresponds to the known data sample when t=1 and dot 208 corresponds to the known data sample when t=2. Additional dots correspond to values of time t ranging from t=3 to t=10. The "x" locations on the function 202 identify locations where a new data sample can be calculated. For example, an x mark 210 identifies a new data sample between t=1 and t=2. Similarly, an x mark 212 identifies a new data sample between t=3 and t=4. Although FIG. 2 shows eleven known data samples, a particular hypothetical function f(t) can be created from any number of known data samples.

Figure 3:
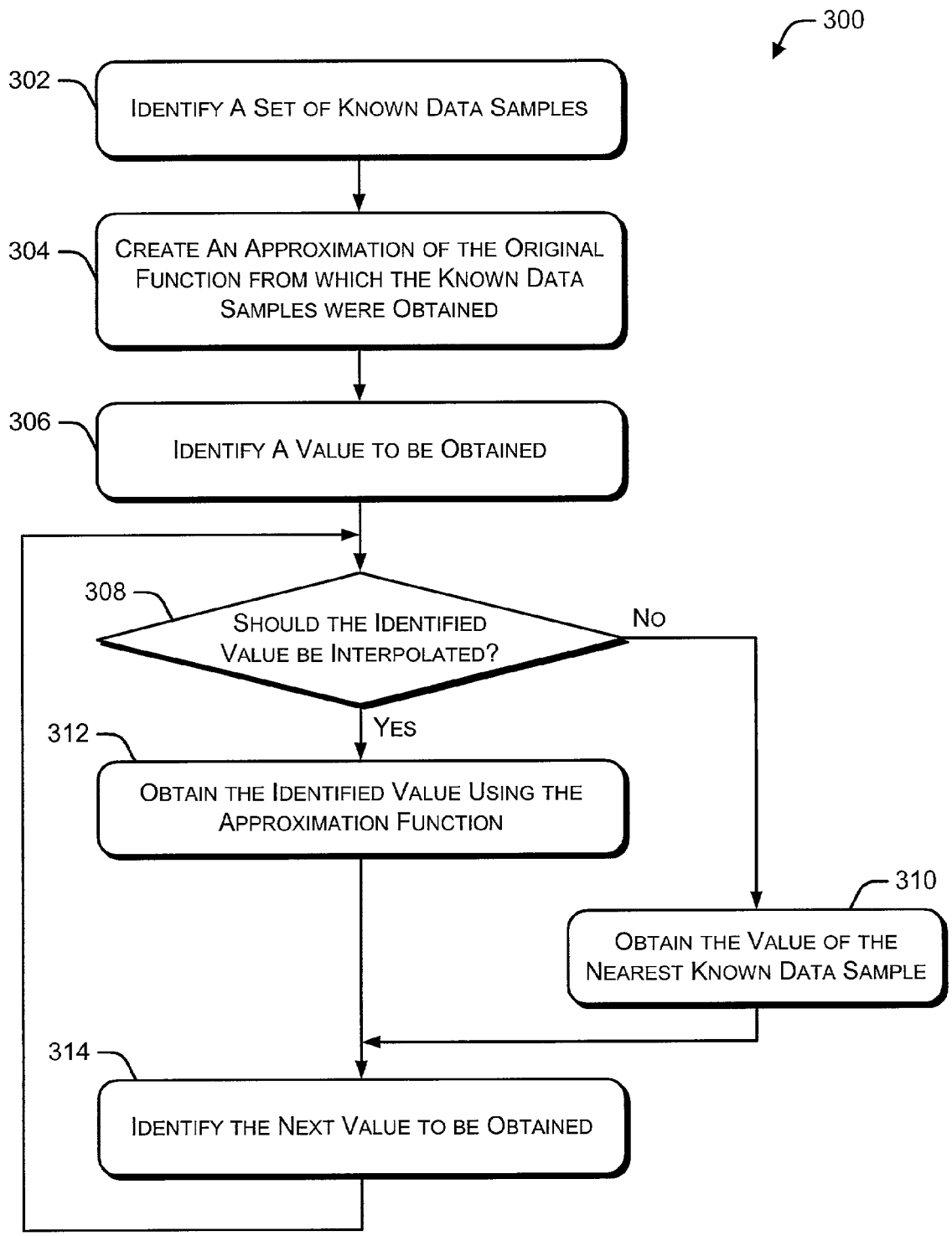
FIG. 3 is a flow diagram illustrating a more detailed procedure for resampling data.

FIG. 3 is a flow diagram illustrating a more detailed procedure 300 for resampling data. Initially, the procedure identifies a set of known data samples (block 302). The procedure creates an approximation of the original function from which the known data samples were obtained (block 304). The procedure then identifies a value to be obtained (block 306). The value may be obtained by interpolation using the approximation function or by selecting the nearest known data sample. At block 308, the procedure determines whether the identified value to be obtained should be interpolated. If the abscissa (x-coordinate) of a point at which a new sample is to be created is very close to that of an original data sample, the original data sample may be used rather than performing interpolation.

If the identified value to be obtained is not interpolated, the procedure obtains the value of the nearest known data sample (block 310). If the identified value to be obtained should be interpolated, then the identified value is obtained using an approximation function (block 312). The procedure then identifies the next value to be obtained (block 314) and returns to block 308 to handle the next value.

The approximation function is created by starting with a set of basis functions $\{(\Phi)_k(x)\}_{k=1...N}$, and then creating a weighted sum of these basis functions such that the resulting function is a close approximation of the original (continuous-time) function from which the data was derived. The set of basis functions could be shifts of a spline, a set of wavelets, a set of discrete-cosine transform functions, or any other set or family of functions and/or combinations of such function-families. The weights needed to create a weighted sum of these functions can be derived in one of several ways, including the Residual Area Criterion described by Kashyap and Moni in "*Using the Residual Area Criterion for Signal Reconstruction from Noiseless and Noisy Samples*" (IEEE Transactions on Signal Processing, March 1996, Volume 44, Issue 3), and including enforcing smoothness conditions described by Deboor in "*A Practical Guide to Splines*" (Springer Verlag (New York); 1978), and in "*On Uniform Approximation by Splines*" (Journal of Approximation Theory, Vol. 1, 1968, pp 219–235).

In an embodiment implementing the Residual Area Criterion, an approximation function is created by generating a set of coefficients g(k) which serve as weights to shift the basic spline $\Phi(x)$. Thus, the approximation function $f_1(x)$ is constructed as weighted shifts of the spline $\Phi(x)$ which is represented by the following formula:

$$f_1(x) = \Sigma k \Phi(x-k) \cdot g(k)$$

The coefficients g(k) that determine the approximation function $f_1(x)$ are found by minimizing the Residual Area Criterion over a chosen space of functions. The Residual Area Criterion can be expressed as the following formula:

$$J_{area}(f) = \Sigma i=1 ... N-1 \int_{x_i} \text{ to } x_{i+1} [f(x) - L_i(x)]^2 dx;$$

where $L_i(x)$ is the line passing through the i-th and (i+1)-th available data points (whose abscissa are denoted by $x_i$ and $x_{i+1}$ respectively). After the approximation function $f_1(x)$ has been created, it is resampled at each output location y to generate the desired outputs $f_1(y)$.

In another embodiment, an approximation function is created by generating a set of coefficients g(n) using an approximation of the interpolating function. The coefficients g(n) serve as weights to shift the basic spline $\Phi(x)$. Thus, the approximation function $f_1(x)$ is constructed as weight shifts of the spline $\Phi(x)$. The set of coefficients g(n) is represented by the following formula:

$$g(n) = \text{SUM over } k\, f(n-k) \cdot h(k)$$

Next, the points at which the spline $\Phi(x)$ needs to be evaluated are determined. Since the procedure is using shifts of the same function to construct the approximation function, there is a finite number of points at which $\Phi(x)$ needs to be evaluated. Furthermore, in this case $\Phi_k(y) = \Phi(y-k)$.

Next, the procedure determines the cadence and phases with which the resampling is to be done. A table is created that determines which samples of $\Phi(x)$ are required for each output sample and determines the appropriate weight. Due to the cyclic nature of the approximation, the size of the table depends on the sampling ratio.

Finally, the coefficients g(n) are utilized to resample $f_1(x)$ at the appropriate points. This is performed by constructing an approximation for each output location y as follows:

$$f_1(y) = \text{SUM } \Phi_k(y) \cdot g(k)$$

In addition to the resampling ratio, there are two parameters that can be selected in the process: the spline order (K) and the interpolation order (L). The higher the spline order, the higher the degree of smoothness imposed on the resulting output. Setting the spline order to three is a good setting for audio/video quality processing. The interpolation order refers to the effort expended in generating a linear combination of splines that interpolates the given data. The higher the order, the better the accuracy of the interpolation at the data points, but the more the overshoots and undershoots between data samples, and the more the computational requirement. A particular implementation uses an interpolation order corresponding to a nine-tap filter to give good quality at reasonable computational expense.

Figure 4:
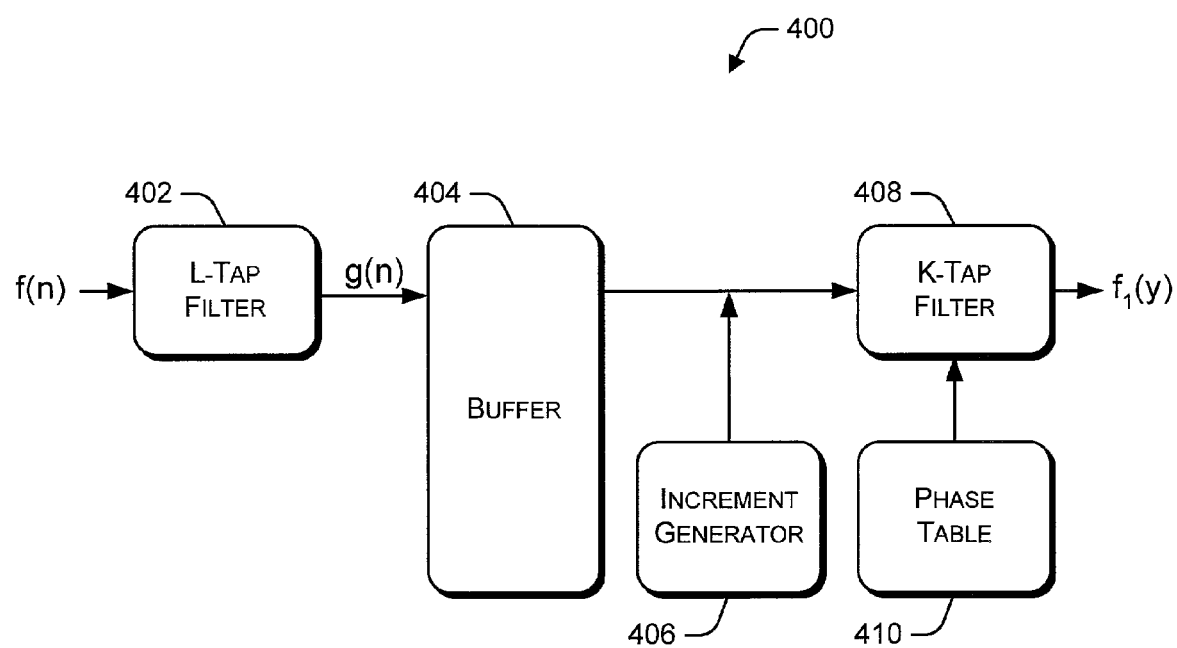
FIG. 4 is a block diagram showing various components of an example resampling system.

FIG. 4 is a block diagram showing various components of an example resampling system 400. An L-tap filter 402 receives the known data samples f(n) and outputs coefficients g(n) to a buffer 404. The buffer stores various g(n) values for later use. An increment generator 406 is coupled to pick the proper g(n) value based on a phase table and how much of the approximation function sequence the procedure has completed. The selected g(n) value is provided to a K-tap filter 408, which also receives data from a phase table 410. The k-tap filter 408 outputs $f_1(y)$.

As shown in FIG. 4, a particular implementation of function-based resampling first generates the coefficients g(n) and then uses those coefficients to generate the resampled output $f_1(y)$. The phase table as well as the increment values are typically computed off-line since they are data-independent, and dependent upon the resampling ratio, interpolation order, and spline order.

Figure 5:
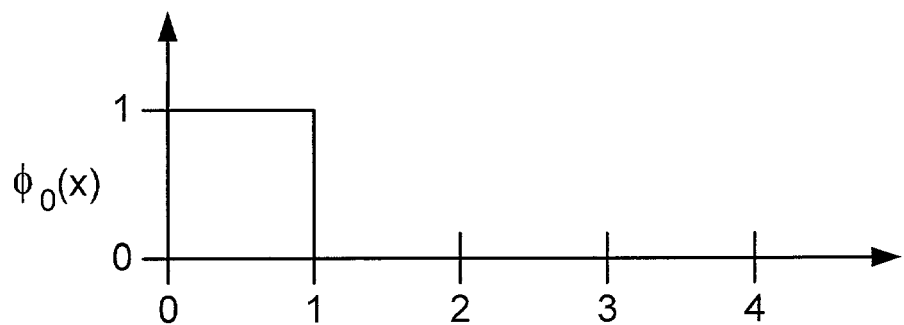
FIGS. 5–7 illustrate different splines that may be used with the methods and systems described herein.
Figure 6:
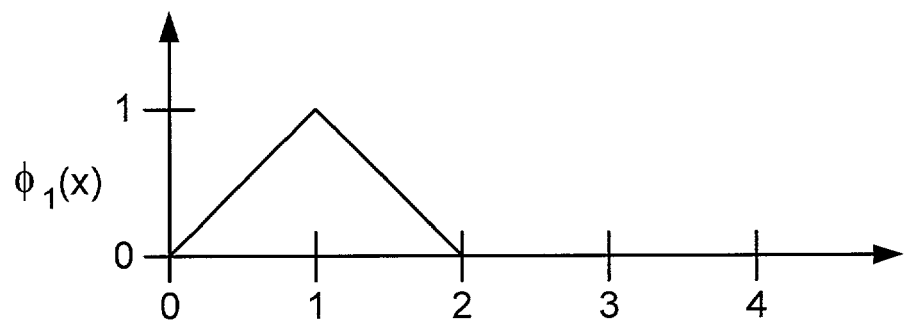
Figure 7:
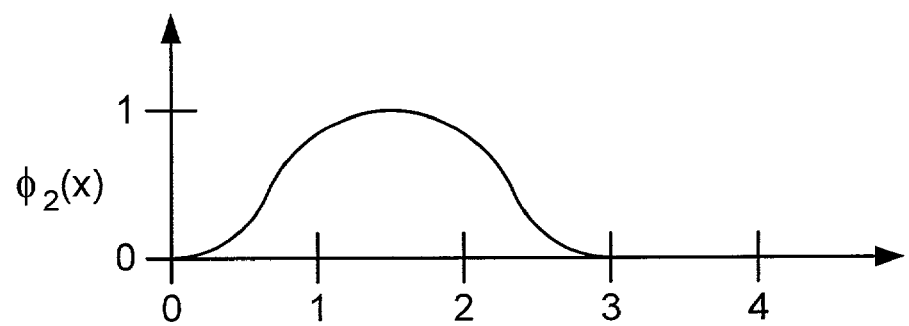

FIGS. 5–7 illustrate different splines that may be used with the methods and systems described herein. FIG. 5 illustrates a first spline $\Phi_0(x)$, FIG. 6 illustrates a second alpine $\Phi_1(x)$, and FIG. 7 illustrates a third spline $\Phi_2(x)$ to reflect that the derivative is zero at x=0 and at x=3. Each successive spline is further smoothed.

The procedures discussed herein convert discrete time domain data (i.e., the known data samples) into a hypothetical function in the continuous time domain. Data is then interpolated in the continuous time domain using the hypothetical function, which brings the process back to a discrete time domain.

Figure 8:
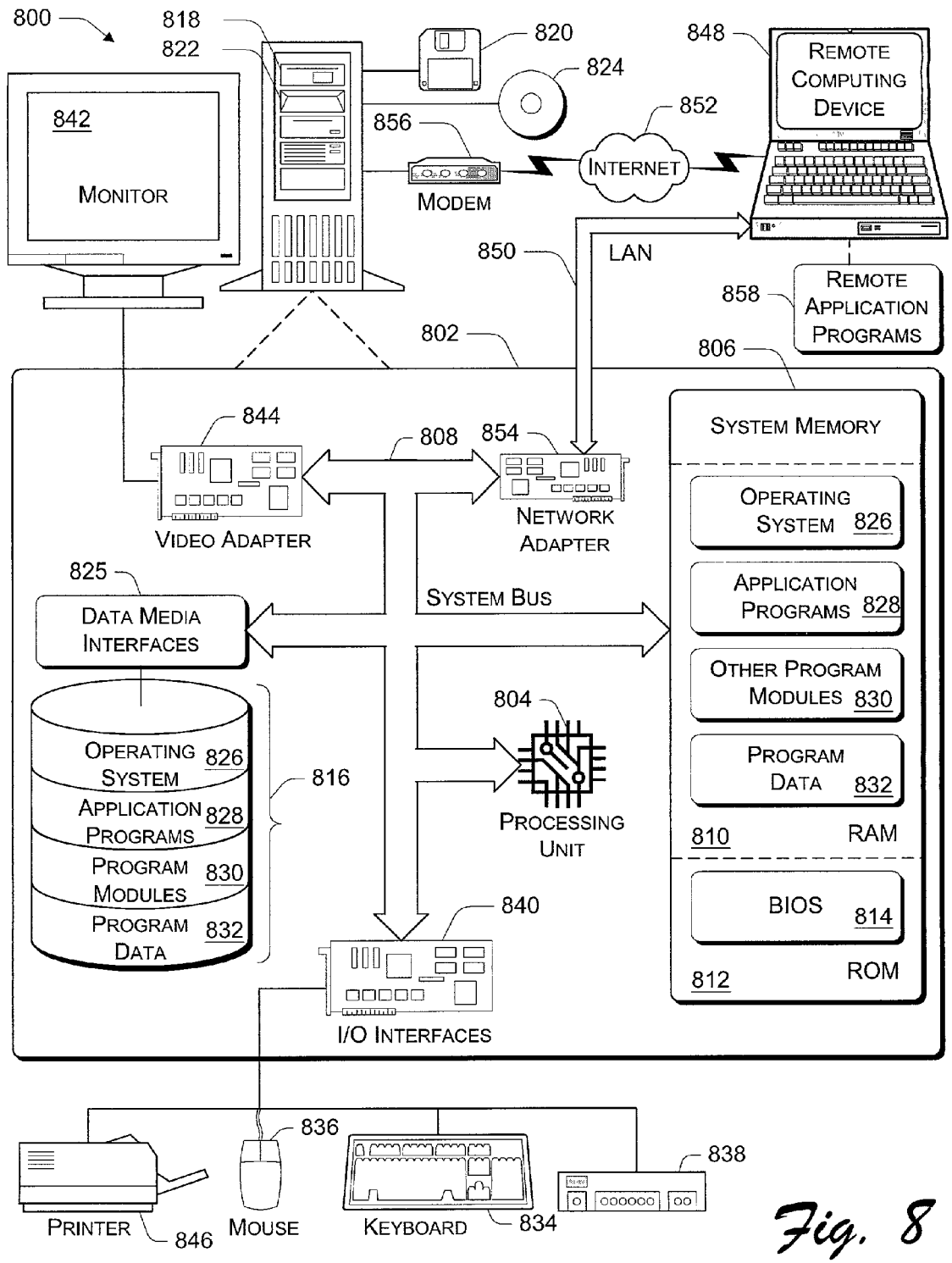
FIG. 8 illustrates an example of a suitable computing environment within which the function-based resampling technique discussed herein may be implemented.

FIG. 8 illustrates an example of a suitable computing environment 800 within which the function-based resampling technique discussed herein may be implemented. The systems and methods described herein may be implemented with any number of general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions may also be implemented in clients of limited resources.

The computing environment 800 includes a general-purpose computing device in the form of a computer 802. The components of computer 802 can include, by are not limited to, one or more processors or processing units 804, a system memory 806, and a system bus 808 that couples various system components including the processor 804 to the system memory 806.

The system bus 808 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 802 typically includes a variety of computer readable media. Such media can be any available media that is accessible by computer 802 and includes both volatile and non-volatile media, removable and non-removable media. The system memory 806 includes computer readable media in the form of volatile memory, such as random access memory (RAM) 810, and/or non-volatile memory, such as read only memory (ROM) 812. A basic input/output system (BIOS) 814, containing the basic routines that help to transfer information between elements within computer 802, such as during start-up, is stored in ROM 812. RAM 810 typically contains data and/or program modules that are immediately accessible to and/or presently operated on by the processing unit 804.

Computer 802 may also include other removable/non-removable, volatile/non-volatile computer storage media. By way of example, FIG. 8 illustrates a hard disk drive 816 for reading from and writing to a non-removable, non-volatile magnetic media (not shown), a magnetic disk drive 818 for reading from and writing to a removable, non-volatile magnetic disk 820 (e.g., a "floppy disk"), and an optical disk drive 822 for reading from and/or writing to a removable, non-volatile optical disk 824 such as a CD-ROM, DVD-ROM, or other optical media. The hard disk drive 816, magnetic disk drive 818, and optical disk drive 822 are each connected to the system bus 808 by one or more data media interfaces 825. Alternatively, the hard disk drive 816, magnetic disk drive 818, and optical disk drive 822 can be connected to the system bus 808 by one or more interfaces (not shown).

The disk drives and their associated computer-readable media provide non-volatile storage of computer readable instructions, data structures, program modules, and other data for computer 802. Although the example illustrates a hard disk 816, a removable magnetic disk 820, and a removable optical disk 824, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 816, magnetic disk 820, optical disk 824, ROM 812, and/or RAM 810, including by way of example, an operating system 826, one or more application programs 828, other program modules 830, and program data 832. Each of the operating system 826, one or more application programs 828, other program modules 830, and program data 832 (or some combination thereof) may include elements of the function-based resampling technique.

A user can enter commands and information into computer 802 via input devices such as a keyboard 834 and a pointing device 836 (e.g., a "mouse"). Other input devices 838 (not shown specifically) may include a microphone, joystick, game pad, satellite dish, serial port, scanner, and/or the like. These and other input devices are connected to the processing unit 804 via input/output interfaces 840 that are coupled to the system bus 808, but may be connected by other interface and bus structures, such as a parallel port, game port, or a universal serial bus (USB).

A monitor 842 or other type of display device can also be connected to the system bus 808 via an interface, such as a video adapter 844. In addition to the monitor 842, other output peripheral devices can include components such as speakers (not shown) and a printer 846 which can be connected to computer 802 via the input/output interfaces 840.

Computer 802 can operate in a networked environment using logical connections to one or more remote computers, such as a remote computing device 848. By way of example, the remote computing device 848 can be a personal computer, portable computer, a server, a router, a network computer, a peer device or other common network node, and so on. The remote computing device 848 is illustrated as a portable computer that can include many or all of the elements and features described herein relative to computer 802.

Logical connections between computer 802 and the remote computer 848 are depicted as a local area network (LAN) 850 and a general wide area network (WAN) 852. Such networking environments are commonplace in offices, enterprise-wide computer networks, intranets, and the Internet.

When implemented in a LAN networking environment, the computer 802 is connected to a local network 850 via a network interface or adapter 854. When implemented in a WAN networking environment, the computer 802 typically includes a modem 856 or other means for establishing communications over the wide area network 852. The modem 856, which can be internal or external to computer 802, can be connected to the system bus 808 via the input/output interfaces 840 or other appropriate mechanisms. It is to be appreciated that the illustrated network connections are exemplary and that other means of establishing communication link(s) between the computers 802 and 848 can be employed.

In a networked environment, such as that illustrated with computing environment 800, program modules depicted relative to the computer 802, or portions thereof, may be stored in a remote memory storage device. By way of example, remote application programs 858 reside on a memory device of remote computer 848. For purposes of illustration, application programs and other executable program components such as the operating system are illustrated herein as discrete blocks, although it is recognized that such programs and components reside at various times in different storage components of the computing device 802, and are executed by the data processor(s) of the computer.

An implementation of the system and methods described herein may result in the storage or transmission of data, instructions, or other information across some form of computer readable media. Computer readable media can be any available media that can be accessed by a computer. By way of example, and not limitation, computer readable media may comprise "computer storage media" and "communications media." "Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as a carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Alternatively, portions of the systems and methods described herein may be implemented in hardware or a combination of hardware, software, and/or firmware. For example, one or more application specific integrated circuits (ASICs) or programmable logic devices (PLDs) could be designed or programmed to implement one or more portions of the video encoding or video decoding systems and procedures.

Although the invention has been described in language specific to structural features and/or methods, it is to be understood that the invention defined in the appended claims is not necessarily limited to the specific features or methods described. Rather, the specific features and methods are disclosed as preferred forms of implementing the claimed invention.

The invention claimed is:

1. A method for resampling video or audio data comprising:
   identifying a set of known data samples representing video or audio data;
   creating an approximation function of an original function from which the known data samples were obtained by creating a sum of a set of weighted spline basis functions, the creating of the approximating function including:
      selecting a spline order and an interpolation order for the approximation function;
      deriving weights of the weighted spline basis functions at least in part by minimizing a residual area criterion expressed as:

$J_{area}(f) = \Sigma i=1 \ldots N-1 \int x_i \text{ to } x_{i+1} [f(x) - L_i(x)]^2 dx;$ where $J_{area}(f)$ represents a residual area, $f(x)$ represents an initial estimate of the approximation function, and $L_i(x)$ represents a line passing through an i-th and an (i+1)-th data point;
      creating the set of the weighted spline basis functions by applying the derived weights; and
      creating the approximation function by summing values of the weighted spline basis functions at each ordinate location;
   for each of a plurality of desired video or audio data values, determining whether to use the approximation function to obtain a resample value of the desired video or audio data value or whether to use a nearest known data sample for the resample value of the desired video or audio data value; and
   resampling the video or audio data for the plurality of desired video or audio data values.

2. A method as recited in claim 1, wherein resampling the video or audio data includes resampling a continuous-time approximation function.

3. A method as recited in claim 1, wherein resampling the video or audio data includes resampling a continuous-time approximation function which has been created by interpolating the known data samples representing the video or audio.

4. A method as recited in claim 1, wherein the known data samples represent discrete-time data representing the video or audio data, and wherein resampling the video or audio data includes resampling a continuous-time approximation function which has been created by interpolating the discrete-time data.

5. One or more computer-readable storage media comprising computer-executable instructions that, when executed, direct a computing system to perform the method of claim 1.

6. A method for resampling video or audio data comprising:
   identifying a set of known data samples representing video or audio data;
   creating an approximation function of an original function from which the known data samples were obtained by creating a sum of a set of weighted spline basis functions, the creating of the approximating function including:
      selecting a spline order and an interpolation order for the approximation function;
      deriving weights of the weighted spline basis functions at least in part by minimizing a residual area criterion expressed as:

$J_{area}(f) = \Sigma i=1 \ldots N-1 \int x_i \text{ to } x_{i+1} [f(x) - L_i(x)]^2 dx;$ where $J_{area}(f)$ represents a residual area, $f(x)$ represents an initial estimate of the approximation function, and $L_i(x)$ represents a line passing through an i-th and an (i+1)-th data point;
      creating the set of the weighted spline basis functions by applying the derived weights; and
      creating the approximation function by summing values of the weighted spline basis functions at each ordinate location;
   determining, for each new data value to be obtained, whether the new data value to be obtained should be interpolated using the approximation function or whether the new data value to be obtained should be substituted by a nearest known data sample; and
   resampling the video or audio data using the approximation function to obtain the new data value to be obtained, if a determination is made that the new data value to be obtained should be interpolated, otherwise using the nearest known data sample for the new data value to be obtained if a determination is made not to interpolate using the approximation function for the new data value to be obtained.

7. One or more computer-readable storage media comprising computer-executable instructions that, when executed, direct a computing system to perform the method of claim 6.

8. One or more computer-readable storage media comprising computer executable instructions that, when executed, direct a client device to:

identify a set of known data samples representing video or audio data;

create an approximation function of an original function from which the known data samples were obtained by creating a sum of a set of weighted spline basis functions, the creating of the approximating function including:

selecting a spline order and an interpolation order for the approximation function;

deriving weights of the weighted spline basis functions at least in part by minimizing a residual area criterion expressed as:

$$J_{area}(f) = \Sigma i=1 \ldots N-1 \int x_i \text{ to } x_{i+1} [f(x) - L_i(x)]^2 dx;$$

where $J_{area}(f)$ represents a residual area, $f(x)$ represents an initial estimate of the approximation function, and $L_i(x)$ represents a line passing through an i-th and an (i+1)-th data point;

creating the set of the weighted spline basis functions by applying the derived weights; and creating the approximation function by summing values of the weighted spline basis functions at each ordinate location;

for each of a plurality of desired video or audio data values, determine whether to use the approximation function to obtain a resample value of the desired video or audio data value or whether to use a nearest known data sample for the resample value of the desired video or audio data value;

obtain a resample value of a desired video or audio data value by using the approximation function; and obtain another resample value of another desired video or audio data value by using a nearest know data sample.

9. One or more computer-readable storage media as recited in claim 8 wherein resampling includes resampling a continuous-time approximation function which has been created by interpolating the known data samples.

10. One or more computer-readable storage media as recited in claim 8 wherein the known data samples represent discrete-time data, and wherein resampling includes resampling a continuous-time approximation function which has been created by interpolating the discrete-time data.

* * * * *